(12) United States Patent
Schuler et al.

(10) Patent No.: US 6,303,726 B1
(45) Date of Patent: Oct. 16, 2001

(54) PRESSURE SENSITIVE MATERIALS BASED ON A MULTISTEP CONSTITUTED OF POLYMERIZATES

(75) Inventors: Bernhard Schuler, Mannheim; Gerhard Auchter, Bad Dürkheim; Johannes Türk, Böhl-Iggelheim; Rik Noordijk, Limburgerhof; Johannes Dobbelaar, Wachenheim; Reinhard Bächer, Bad Dürkheim; Wolfgang Hümmer, Birkenheide, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/147,659

(22) PCT Filed: Jul. 29, 1997

(86) PCT No.: PCT/EP97/04103

§ 371 Date: Feb. 9, 1999

§ 102(e) Date: Feb. 9, 1999

(87) PCT Pub. No.: WO98/06764

PCT Pub. Date: Feb. 19, 1998

(30) Foreign Application Priority Data

Aug. 9, 1996 (DE) .............................. 196 32 202

(51) Int. Cl.⁷ .................................. C08F 118/02
(52) U.S. Cl. ................ 526/319; 526/317.1; 526/346; 156/327; 156/332; 428/349
(58) Field of Search ................ 526/319, 317.1, 526/346; 524/556, 558, 560, 561, 562, 833; 156/327, 332; 428/349

(56) References Cited

U.S. PATENT DOCUMENTS

| | | | |
|---|---|---|---|
| 4,077,926 | * 3/1978 | Sanderson et al. | 260/29.5 |
| 4,303,581 | * 12/1981 | Levine et al. | 260/18 |
| 4,371,659 | 2/1983 | Druschke et al. | |
| 4,453,997 | * 6/1984 | Hori et al. | 156/305 |
| 4,939,190 | 7/1990 | Tomioka et al. | |
| 5,028,484 | * 7/1991 | Martin et al. | 428/352 |
| 5,405,693 | 4/1995 | Dittrich et al. | |
| 5,416,134 | 5/1995 | Skoglund | |
| 5,889,105 | * 3/1999 | Satsuma et al. | 524/560 |

FOREIGN PATENT DOCUMENTS

| | | |
|---|---|---|
| 1 329 443 | 5/1994 | (CA) . |
| 30 13 812 | 10/1981 | (DE) . |
| 0 215 241 | 3/1987 | (EP) . |
| 0 625 557 | 11/1994 | (EP) . |
| 930761 | * 7/1963 | (GB) . |

OTHER PUBLICATIONS

Derwent Abstract JP 59227967A, Dec. 21, 1984; Abstract 1985–034417.*

* cited by examiner

Primary Examiner—David W. Wu
Assistant Examiner—Tanya Zalukaeva
(74) Attorney, Agent, or Firm—Oblon, Spivak, McClelland, Maier & Neustadt, P.C.

(57) ABSTRACT

A polymer which contains
  from 50 to 99.98% by weight of a $C_1$–$C_{12}$ alkyl (meth) acrylate a),
  from 0.02 to 10% by weight of a vinylaromatic compound b),
  from 0 to 10% by weight of an ethylenically unsaturated acid or of an ethylenically unsaturated acid anhydride c), and
  from 0 to 40% by weight of further monomers d), the percentages by weight being based on the polymer and the polymer being obtainable by polymerizing the monomers a) to d) in at least two stages which differ in their content of vinylaromatic compounds in such a way that the content of vinylaromatic compounds in the vinylaromatics-rich stage is at least 5 times as great as in the low-vinylaromatics stage.

5 Claims, No Drawings

PRESSURE SENSITIVE MATERIALS BASED ON A MULTISTEP CONSTITUTED OF POLYMERIZATES

BACKGROUND OF THE INVENTION

1. Field of the Invention

The invention relates to a polymer, which contains from 50 to 99.98% by weight of a $C_1$–$C_{12}$ alkyl (meth)acrylate a), from 0.02 to 10% by weight of a vinylaromatic compound b), from 0 to 10% by weight of an ethylenically unsaturated acid or of an ethylenically unsaturated acid anhydride c), and from 0 to 40% by weight of further monomers d), the percentages by weight being based on the polymer and the polymer being obtainable by polymerizing the monomers a) to d) in at least two stages which differ in their content of vinylaromatic compounds in such a way that the content of vinylaromatic compounds in the vinylaromatics-rich stage is at least 5 times as great as in the low-vinylaromatics stage.

Furthermore, the invention relates to the use of the polymers or of their aqueous dispersions as pressure-sensitive adhesives.

2. Description of the Background

Pressure-sensitive adhesives (PSAs) form a permanent tacky film which at room temperature, even under slight pressure, sticks to a very wide variety of surfaces. Pressure-sensitive adhesives are used to produced self-adhesive products such as self-adhesive labels, tapes and films. Products of this kind are very simple to use and make it possible to work rapidly when bonding. In contrast to contact adhesive compositions, no ventilation times are necessary. Moreover, there is no "open time" within which the adhesive bond must be implemented. The quality of a self-adhesive article depends essentially on whether the cohesion and the adhesion of the film of adhesive to the surface that is to be bonded are in tune with one another in accordance with the application.

In the case of pressure-sensitive adhesives for labels, in particular, the level of cohesion must be sufficient for no stringing and no emergence of glue at the edges to occur in the course of stamping and cutting, since otherwise the cutting tools become soiled and the cut faces sticky. At the same time, the adhesion should be at a high level in order to provide good sticking on the substrate that is to be bonded.

In general it is impossible to optimize adhesion and cohesion independently of one another. There is a desire for measures which either lift the level of both properties, or at least maintain one property unchanged while improving the other.

Adhesives, including pressure-sensitive adhesives, based on polymers which can contain styrene are already known from DE-A-3 013 812. U.S. Pat. No. 5,416,134 and EP-A-625 557. The polymers prepared or used in the examples of the disclosures, however, contain at least 4% by weight of styrene. Copolymers of this kind still do not have the desired level of adhesion and cohesion or the desired ratio of adhesion to cohesion.

U.S. Pat. No. 4,939,190 and EP 215241 disclose pressure-sensitive adhesives comprising polymers of multistage construction.

SUMMARY OF THE INVENTION

It is an object of the present invention, therefore, to provide polymers of improved adhesion and/or cohesion.

We have found that this object is achieved by the polymers defined above and by their use as pressure-sensitive adhesives.

DETAILED DESCRIPTION OF THE PREFERRED EMBODIMENTS

The present polymer preferably contains at least 0.05% by weight of a vinylaromatic compound, or vinylaromatic for short, and preferably not more than 5% by weight, in particular not more than 3% by weight, particularly preferably not more than 2% by weight and, especially, not more than 1.5% by weight of the vinylaromatic compound.

Preferred polymers are composed of from 50 to 99.98% of a $C_1$–$C_{12}$ alkyl (meth)acrylate a) by weight from 0.02 to 10% of a vinylaromatic compound b) by weight from 0 to 10% by of an ethylenically unsaturated acid c) weight from 0 to 40% by of further monomers d), which are different weight from a) to c).

Particularly preferred polymers are composed of

| from 60 to 99.95 | % by weight a) |
| from 0.05 to 5 | % by weight b) |
| from 0 to 5 | % by weight c) |
| from 0 to 35 | % by weight d) |

Very particularly preferred polymers are composed of

| from 80 to 99.75 | % by weight a) |
| from 0.25 to 1.5 | % by weight b) |
| from 0 to 2 | % by weight c) |
| from 0 to 18 | % by weight d) |

In one particular embodiment the content of monomer c) is at least 0.1% by weight, the maximum content of components a) being reduced accordingly.

The novel polymer is obtainable by polymerizing the monomers a) to d) in at least two stages which differ in their content of vinylaromatic compounds in such a way that the content of vinylaromatics in the vinylaromatics-rich stage is at least 5 times, preferably at least 10 times and, with particular preference, at least 20 times as great as in the low-vinylaromatics stage.

The content of vinylaromatics in the low-vinylaromatics stage is preferably below 0.2, in particular below 0.05 and, with particular preference, below 0.01% by weight, based on the polymer.

With particular preference, the low-vinylaromatics stage is essentially free from vinylaromatics.

The proportion of the vinylaromatics-rich stage is preferably 10–90% by weight, particularly preferably from 30 to 70% by weight and, with very particular preference, from 40 to 60% by weight; that of the low-vinylaromatics stage is, accordingly, preferably from 90 to 10% by weight, particularly preferably from 70 to 30 and, with very particular preference, from 60 to 40% by weight, the weight data being based in each case on the complete polymer.

In one preferred embodiment the proportion of the two stages is approximately equal, ie. about 50% by weight.

The sequence of polymerization of the individual stages is arbitrary. Thus it is possible, for example, first to polymerize the monomers of the vinylaromatics-rich stage and then the monomers of the low-vinylaromatics stage, or vice versa.

The monomer composition of the individual stages can be identical or different. In one possible embodiment, for example, the content of monomers c) in the 1st stage is higher than in the 2nd stage; for example, the amount of monomers c) in the 1st stage can be at least 1.2 times the amount of monomers c) of the 2nd stage.

The monomers of each individual stage are polymerized in the presence of the polymerization product of the previous stages.

The polymerization is preferably an emulsion polymerization, in which case aqueous polymer dispersions are obtained.

The monomers of one stage are preferably added to the reaction mixture of the emulsion polymerization only when the monomers of the preceding stage of the [sic] are already entirely in the reaction mixture and, with particular preference, when the monomers of the preceding stage have already polymerized to an extent of at least 60% by weight, very preferably at least 80% by weight, based on the monomers of the preceding stage (in other words, less than 40% by weight or, respectively, less than 20% by weight are still in monomer form).

Particularly suitable $C_1$–$C_{12}$ alkyl (meth)acrylates are methyl acrylate, methyl methacrylate, ethyl acrylate, n-butyl acrylate and 2-ethylhexyl acrylate, n-butyl methacrylate, t-butyl methacrylate, isobutyl acrylate and isooctyl acrylate.

In one particularly preferred embodiment the monomers a) necessarily include $C_1$–$C_2$-alkyl (meth)acrylates (monomers $a_1$)) in addition to $C_3$–$C_{12}$-alkyl (meth)acrylates (monomers $a_2$)).

In particular, from 5 to 50% by weight, preferably from 10 to 40% by weight and, with particular preference, from 10 to 20% by weight of the overall amount of monomers a) are monomers $a_1$), ie. methyl (meth)acrylate or ethyl (meth) acrylate, preferably methyl acrylate.

Preferred vinylaromatic compounds are those having up to 20 carbons. Suitable examples are vinyltoluene, α- and β-methylstyrene. Styrene is particularly preferred.

Examples of ethylenically unsaturated acids or anhydrides c) are maleic acid, fumaric acid, itaconic acid and, preferably, acrylic acid or methacrylic acid, (meth)acrylic anhydride or maleic anhydride.

Further monomers which may be mentioned are, in particular, alkyl (meth)acrylates having more than 12 carbons in the alkyl radical, hydroxyl-containing monomers, especially $C_1$–$C_{10}$-hydroxyalkyl (meth)acrylates, vinyl esters of $C_1$–$C_{20}$ carboxylic acids, such as vinyl acetate and vinyl propionate, vinyl ethers, preferably of $C_1$–$C_4$ alcohols, for example vinyl methyl ether or vinyl isobutyl ether, and hydrocarbons having 2 to 8 carbons and one or two ethylenically unsaturated groups, for example ethylene, butadienes or isoprene, and monomers containing nitrile groups, for example (meth)acrylonitrile.

The monomers can preferably be polymerized by a free-radical method or, where possible, by an anionic method. Both free-radical and anionic polymerization are, as customary polymerization methods, familiar to the skilled worker.

The emulsion polymerization is carried out using ionic and/or nonionic emulsifiers and/or protective colloids and/or stabilizers as surface-active compounds.

A detailed description of suitable colloids is given in HoubenWeyl, Methoden der organischen Chemie, Volume XIV/1, Makromolekulare Stoffe [Macromolecular substances], Georg-Thieme-Verlag, Stuttgart, 1961, pp. 411 to 420. Suitable emulsifiers include anionic, cationic and nonionic emulsifiers. As accompanying surface-active substances it is preferred to use exclusively emulsifiers, whose molecular weights—unlike those of the protective colloids—are usually below 2000 g/mol. Where mixtures of surface-active substances are used the individual components must of course be mutually compatible, which in case of doubt can be checked by means of a few preliminary experiments. Anionic and nonionic emulsifiers are preferably used as surface-active substances. Examples of customary accompanying emulsifiers are ethoxylated fatty alcohols (EO degree: 3 to 50, alkyl: $C_8$–$C_{36}$), ethoxylated mono-, di- and trialkylphenols (EO degree: 3 to 50, alkyl: $C_4$–$C_9$), alkali metal salts of dialkyl esters of sulfosuccinic acid, and also alkali metal and ammonium salts of alkyl sulfates (alkyl: $C_8$–$C_{12}$), of ethoxylated alkanols (EO degree: 4 to 30, alkyl: $C_{12}$–$C_{18}$), of ethoxylated alkyl phenols (EO degree: 3 to 50, alkyl: $C_4$ to $C_9$), of alkylsulfonic acids (alkyl: $C_{12}$–$C_{18}$) and of alkylarylsulfonic acids (alkyl: $C_9$–$C_{18}$).

Further suitable emulsifiers are compounds of the formula II

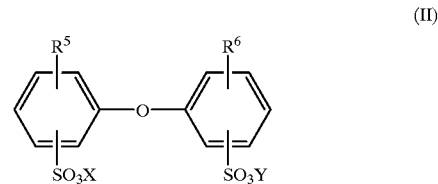

(II)

where $R^5$ and $R^6$ are hydrogen or $C_4$–$C_{14}$-alkyl but are not both hydrogen and X and Y can be alkali metal ions and/or ammonium ions. $R^5$ and $R^6$ are preferably linear or branched alkyls of 6 to 18 carbons, or hydrogen, and in particular have 6, 12 or 16 carbons and are not both simultaneously hydrogen. X and Y are preferably sodium, potassium or ammonium ions, particular preference being given to sodium. Particularly advantageous compounds II are those in which X and Y are sodium, $R^5$ is a branched $C_{12}$ alkyl and $R^6$ is hydrogen or $R^5$. Use is frequency made of technical-grade mixtures containing a proportion of from 50 to 90% by weight of the monoalkylated product, an example being Dowfax® 2A1 (trade mark of Dow Chemical Company).

Suitable emulsifiers are also given in Houben-Weyl, loc. cit., pp. 192 to 208.

Examples of emulsifier trade names are Dowfax® 2A1, Emulan® NP 50, Dextrol® OC 50, Emulgator 825, Emulgator 825 S, Emulan® OG, Texapon® NSO, Nekanil® 904 S, Lumiten® I-RA, Lumiten E 3065, Disponil FES, Lutensol AT 18, Steinapol NLS and Emulphor NPS 25.

The surface-active substance is usually used in amounts of from 0.1 to 10% by weight, based on the monomers to be polymerized.

Examples of water-soluble initiators for the emulsion polymerization are ammonium and alkali metal salts of peroxodisulfuric acid, for example sodium peroxodisulfate, hydrogen peroxide or organic peroxides, for example tert-butyl hydroperoxide.

Redox (reduction-oxidation) initiator systems are particularly suitable, and consist of at least one, usually inorganic, reducing agent and an inorganic or organic oxidizing agent.

The oxidation component comprises, for example, the abovementioned initiators for emulsion polymerization.

The reduction component comprises, for example, alkali metal salts of sulfurous acid, such as sodium sulfite, sodium hydrogen sulfite, alkali metal salts of disulfurous acid, such as sodium disulfite, bisulfite addition compounds of aliphatic aldehydes and ketones, such as acetone bisulfite, or reducing agents such as hydroxymethanesulfinic acid and its salts, or ascorbic acid. The redox initiator systems can be used along with soluble metal compounds whose metallic component is able to exist in a plurality of valence states.

Examples of customary redox initiator systems are ascorbic acid/iron(II) sulfate/sodium peroxodisulfate, tert-butyl hydroperoxide/sodium disulfite, tert-butyl hydroperoxide/sodium hydroxymethanesulfinate. The individual components, for example the reduction component, can also be mixtures, for example a mixture of the sodium salt of hydroxymethansulfinic acid and sodium disulfite.

These compounds are usually employed in the form of aqueous solutions, the lower concentration being determined by the amount of water which is acceptable in the dispersion and the upper concentration by the solubility of the relevant compound in water.

In general, the concentration is from 0.1 to 30% by weight, preferably from 0.5 to 20% by weight, and, with particular preference, from 1.0 to 10% by weight, based on the solution.

The amount of initiators is generally from 0.1 to 10% by weight, preferably from 0.5 to 5% by weight, based on the monomers to be polymerized. It is also possible to use two or more different initiators in the course of the emulsion polymerization.

In addition, regulators can also be added during polymerization, thereby reducing the molar mass. Suitable examples are compounds containing a thiol group, such as tert-butyl mercaptan, ethylacryl [sic] thioglycolate, mercaptoethanol, mercaptopropyltrimethoxy-silane or tert-dodecyl mercaptan. The proportion of these regulators can be in particular from 0 to 0.3% by weight, preferably from 0.02 to 0.3% by weight, based on the polymer.

The regulator can be present in equal amounts in all stages or else can be unequally divided; for example, in one particular embodiment the regulator in the 2nd stage is present in at least 1.2 times the amount, preferably at least 1.5 times the amount, in which it is present in the 1st stage.

The emulsion polymerization is generally conducted at from 30 to 95° C., preferably from 50 to 90° C. The polymerization medium can consist either just of water or of mixtures of water and water-miscible liquids such as methanol. Preferably, only water is used. The emulsion polymerization can be carried out either batchwise or in the form of a feed process, including a stepwise or gradient procedure. The feed technique is preferred, in which some of the polymerization batch is introduced as initial charge, heated to the polymerization temperature and then initially polymerized, before the remainder of the polymerization batch is supplied, in the course of continuing polymerization, to the polymerization zone continuously, stepwise or under a concentration gradient and usually by way of a plurality of spatially separate feed streams, of which one or more contain the monomers in pure or emulsified form.

The manner in which the initiator is added to the polymerization vessel in the course of the free-radical aqueous emulsion polymerization is familiar to the person of average skill in the art. It can either be included entirely in the initial charge to the polymerization vessel or else introduced stepwise or continuously in the course of the free-radical aqueous emulsion polymerization at the rate at which it is consumed. In an individual case this will depend, as familiar per se to the person of average skill in the art, both on the chemical nature of the initiator system and on the polymerization temperature. Preferably, some is included in the initial charge and the remainder is supplied to the polymerization zone at the rate at which it is consumed.

In order to remove the residual monomers it is common to add initiator even after the end of the actual emulsion polymerization, ie. after a monomer conversion of at least 95%.

In the case of the feed technique the individual components can be supplied to the reactor from above, laterally or from below, through the reactor base.

The emulsion polymerization produces aqueous polymer dispersions having, in general, solids contents of from 15 to 75% by weight, preferably from 40 to 75% by weight.

For a high space-time yield of the reactor, dispersions of very high solids content are preferred. In order to make it possible to obtain solids contents >60% by weight, a bimodal or polymodal particle size should be established, since otherwise the viscosity becomes too high and the dispersion can no longer be handled. A new generation of particles can be produced, for example, by adding seed (EP 81083), by adding excess emulsifier or by adding miniemulsions. A further advantage associated with the low viscosity at high solids content is the improved coating characteristics at high solids contents. The production of (a) new particle generation(s) can be carried out at any desired point in time. It is guided by the particle-size distribution that is desired for a low viscosity.

The novel polymers can be used as adhesives, especially pressure-sensitive adhesives. They are particularly suitable as pressure-sensitive adhesives for labels.

The polymers are preferably used in the form of their aqueous dispersion.

In the case of utility as pressure-sensitive adhesive, a tackifier, ie. a tackifying resin, is preferably added to the polymers or to the aqueous polymer dispersions. Tackifiers are known, for example, from Adhesives Age, July 1987, pages 19–23 or Polym. Mater. Sci. Eng. 61 (1989), pages 588–592.

Examples of tackifiers are natural resins, such as rosins and their derivatives, produced by disproportionation or by isomerization, polymerization, dimerization and/or hydrogenation. They can be present in their salt form (for example with mono- or polyvalent counterions (cations)) or, preferably, in their esterified form. Alcohols used for the esterification can be monohydric or polyhydric; examples are methanol, ethanediol, diethylene glycol, triethylene glycol, 1,2,3-propanethiol [sic] and pentaerythritol.

Also used, furthermore, are hydrocarbon resins, for example indene-coumarone resins, polyterpene resins, hydrocarbon resins based on unsaturated CH compounds, such as butadiene, pentene, methylbutene, isoprene, piperylene, divinylmethane, pentadiene, cyclopentene, cyclopentadiene, cyclohexadiene, styrene, α-methylstyrene and vinyltoluene.

Further compounds increasingly being used as tackifiers are polyacrylates of low molar weight. These polyacrylates preferably have a weight-average molecular weight $M_w$ of below 30,000 and a content of $C_1$–$C_8$-alkyl (meth)acrylates of at least 60% by weight, in particular at least 80% by weight.

Preferred tackifiers are naturally occurring or chemically modified rosins. Rosins consist predominantly of abietic acid or its derivatives.

The tackifiers can be added in a simple manner to the novel polymers, preferably to the aqueous dispersions of the polymers. The tackifiers are preferably themselves in the form of an aqueous dispersion in this case.

The proportion of the tackifiers is preferably from 5 to 100 parts by weight, particularly preferably from 10 to 50 parts by weight, based on 100 parts by weight of polymer (solids/solids).

In addition to tackifiers it is also possible for other additives, such as thickeners, antifoams, plasticizers, pigments, wetting agents or fillers, to be employed in the case of utility as adhesive, or pressure-sensitive adhesive.

In the case of the latter utility, the novel polymers and aqueous dispersions or aqueous preparations can be applied by customary methods, for example by rolling, knife coating, spreading, etc., to substrates, for example paper or polymer films consisting, preferably, of polyethylene, polypropylene, which can be biaxially or monoaxially oriented, polyethylene terephthalate, polyvinyl chloride, polystyrene, polyamide or metal. The water can be removed preferably by drying at from 50 to 150° C. For subsequent use, the side of the substrates, for example the labels, that is coated with the (pressure-sensitive) adhesive can be covered with a release paper, for example siliconized paper.

When used as adhesives the novel polymers exhibit improved cohesion and/or an enhanced adhesion/cohesion ratio.

EXAMPLES

Test Methods a) Preparing the Test Strips

The dispersion to be tested is blended 75/25 (based on solids) with a commercial aqueous rosin ester dispersion (Tacolyn 3179, from Hercules). The mixture is applied to siliconized paper in a thin film, using a doctor blade, and is dried at 90° C. for 3 minutes. The gap height of the doctor blade is chosen so that the weight per unit area of the dried adhesive is 19–21 $g/m^2$. White commercial label paper (basis weight 80 $g/m^2$) is placed on the dried adhesive and rolled on firmly using a manual roller. The resulting label laminate is cut into 0.5 inch strips 2 cm wide. Prior to testing, the strips are stored under standard atmospheric conditions for at least 24 h.

b) Testing the Shear Strength as a Measure of the Cohesion (in Accordance with FINAT FTM 7)

After peeling off the siliconized paper, the label test strip is bonded to the edge of a stainless steel sheet so as to give a bond area of 0.5 inch ×0.5 inch. 20 minutes after bonding, a 500 g weight is fastened to the protruding end of the strip of paper, and the metal sheet is suspended vertically. Ambient conditions: 23° C., 50% relative atmospheric humidity. The shear strength is taken as the time, in minutes, until failure of the adhesive bond under the effect of the weight, as the mean from the results of three test specimens.

c) Testing the Peel Strength as a Measure of the Adhesion (in Accordance with FINAT FTM 1)

After peeling off the siliconized paper, a label strip 2 cm wide is bonded to a stainless steel sheet. Ambient conditions: 23° C., 50% relative atmospheric humidity. One minute after bonding, the strip is peeled off at an angle of 180° C. at a rate of 75 mm/min with the aid of a tensile testing apparatus. The peel strength is taken to be the force, in N/2 cm, required for this, as a mean from the results of three test specimens. In addition, the aspect at fracture is assessed; the key used is as follows:

A adhesive fracture, no residue on the stainless steel sheet

K cohesive fracture (separation within the adhesive)

F thin, nonadhering film on the stainless steel sheet; adhesive remains on the paper strip PR paper tears

Comparison Example 1

A solution of 0.75 g of ascorbic acid in 328 g of water is heated with stirring to 85° C. in a polymerization reactor, and then a solution of 0.6 g of sodium peroxodisulfate in 8 g of water is added, while maintaining stirring. After 5 minutes, feedstream 1 is started and is added for the first 10 minutes at the rate of 1.9 g/min. Then, for the next 10 minutes, the rate of addition of feedstream 1 is raised to 3.8 g/min and then for a further 10 minutes to 5.7 g/min. The rate of addition is then raised to 9.96 g/min and held constant over a further 180 minutes. Concurrently with feedstream 1, the addition of a solution of 5.4 g of sodium peroxodisulfate in 72 g of water is started and is continued at a constant rate of addition over 210 minutes. After the end of feedstream 1, stirring is continued at 85° C. for 15 minutes and then the batch is cooled to 80° C. Still at 80° C. and with stirring, 15 g of a 10% strength solution of tert-butyl hydroperoxide in water and, concurrently, a solution of 1.5 g of sodium disulfite in a mixture of 10 g of water and 1.4 g of acetone are metered in.

Feedstream 1:

340 g of water, 51.4 g of a 35% strength aqueous solution of the sodium salt of the sulfuric monoester of nonylphenol ethoxylated with 25 ethylene oxide units, 15 g of a 25% strength aqueous solution of sodium hydroxide, 1.05 g of tert-dodecyl mercaptan, 7.5 g of acrylic acid (AA), 247.5 g of methyl acrylate (MA), 870 g of butyl acrylate (BA), and 375 g of 2-ethylhexyl acrylate(EHA).

Comparison Example 2

The procedure of Comparison Example 1 is repeated except that, in feedstream 1, 30 g of the methyl acrylate are replaced by styrene (s) [sic].

Comparison Example 3

A solution of 0.75 g of ascorbic acid in 328 g of water is heated with stirring to 85° C. in a polymerization reactor, and then a solution of 0.6 g of sodium peroxodisulfate in 8 g of water is added, while maintaining stirring. After 5 minutes, feedstream 1 is started and is added for the first 10 minutes at the rate of 1.9 g/min. Then, for the next 10 minutes, the rate of addition of feedstream 1 is raised to 3.8 g/min and then for a further 10 minutes to 5.7 g/min. The rate of addition is then raised to 9.96 g/min and held constant over a further 90 minutes. Concurrently with feedstream 1, the addition of a solution of 5.4 g of sodium peroxodisulfate in 72 g of water is started and is continued at a constant rate of addition over 210 minutes. Directly after the end of feedstream 1, feedstream 2 is started and is supplied to the polymerization reactor at a rate of addition of 10.56 g/min. After the end of feedstream 2, stirring is continued at 85° C. for 15 minutes and then the batch is cooled to 80° C. Still at 80° C. and with stirring, 15 g of a 10% strength solution of tert-butyl hydroperoxide in water and, concurrently, a solution of 1.5 g of sodium disulfite in a mixture of 10 g of water and 1.4 g of acetone are metered in.

Feedstream 1:

167 g of water, 25.7 g of a 35% strength aqueous solution of the sodium salt of the sulfuric monoester of nonylphenol ethoxylated with 25 ethylene oxide units, 7.5 g of a 25% strength aqueous solution of sodium hydroxide 0.53 g of tert-dodecyl mercaptan,
3.75 g of acrylic acid,
123.75 g of methyl acrylate,
622.5 g of butyl acrylate
Feedstream 2:
  167 g of water,
  25.7 g of a 35% strength aqueous solution of the sodium salt of the sulfuric monoester of nonylphenol ethoxylated with 25 ethylene oxide units,
  7.5 g of a 25% strength aqueous solution of sodium hydroxide
  0.53 g of tert-dodecyl mercaptan,
  3.75 g of acrylic acid,
  123.75 g of methyl acrylate,
  510 g of butyl acrylate
  112.5 g of 2-ethylhexyl acrylate

Example 1

The procedure of Comparison Example 3 is repeated except that, in feedstream 2, 7.5 g of methyl acrylate are replaced by styrene.

Example 2

The procedure of Comparison Example 1 is repeated except that, in feedstream 1, 3.75 g of methyl acrylate are replaced by acrylic acid.

Example 3

The procedure of Example 1 is repeated except that the compositions of feedstreams 1 and 2 are interchanged.

Example 4

The procedure of Example 1 is repeated with the following feedstreams:
Feedstream 1:
  162 g of water
  15 g of a 15% strength solution of sodium lauryl sulfate
  10 g of a 30% strength aqueous solution of the sodium salt of the sulfuric monoester of lauryl alcohol ethoxylated with 30 ethylene oxide units
  7.5 g of a 25% strength aqueous solution of sodium hydroxide
  0.3 g of tert-dodecyl mercaptan
  3.75 g of acrylic acid
  123.75 g of methyl acrylate
  622.5 g of butyl acrylate
Feedstream 2:
  162 g of water
  15 g of a 15% strength solution of sodium lauryl sulfate
  10 g of a 30% strength aqueous solution of the sodium salt of the sulfuric monoester of lauryl alcohol ethoxylated with 30 ethylene oxide units
  7.5 g of a 25% strength aqueous solution of sodium hydroxide
  0.53 g of tert-dodecyl mercaptan
  3.75 g of acrylic acid
  108.75 g of methyl acrylate
  510 g of butyl acrylate
  112.5 g of 2-ethylhexyl acrylate
  15.0 g of styrene

Example 5

A solution of 0.55 g of ascorbic acid in 517 g of water is heated with stirring to 85° C. in a polymerization reactor, and then a solution of 0.44 g of sodium peroxodisulfate in 8 g of water is added. After 5 minutes, 10% of feedstream 1 is added in a single portion. After 5 minutes the remainder of feedstream 1 is metered in at a constant rate of addition over 90 minutes. Directly after the end of feedstream 1, feedstream 2 is started and is added at a constant rate of addition over 90 minutes. Concurrently with feedstream 1, the addition of a solution of 4 g of sodium peroxodisulfate [lacuna] 72 g of water is started and is continued at a constant rate of addition over 180 minutes. After the end of feedstream 2, stirring is continued at 85° C. for 15 minutes and then the batch is cooled to 80° C. Still at 80° C. and with stirring, 15 g of a 10% strength solution of tert-butyl hydroperoxide in ater and, concurrently, a solution of 1.5 g of sodium disulfite in a mixture of 10 g of water and 1.4 g of acetone are metered in.
Feedstream 1:
  235 g of water
  18.9 g of a 35% strength aqueous solution of the sodium salt of the sulfuric monoester of nonylphenol ethoxylated with 25 ethylene oxide units
  5.5 g of a 25% strength aqueous solution of sodium hydroxide
  0.39 g of tert-dodecyl mercaptan
  2.75 g of acrylic acid
  90.75 g of methyl acrylate
  456.5 g of butyl acrylate
Feedstream 2:
  235 g of water
  18.9 g of a 35% strength aqueous solution of the sodium salt of the sulfuric monoester of nonylphenol ethoxylated with 25 ethylene oxide units
  5.5 g of a 25% strength aqueous solution of sodium hydroxide
  0.39 g of tert-dodecyl mercaptan
  2.75 g of acrylic acid
  79.75 g of methyl acrylate
  374 g of butyl acrylate
  82.5 g of 2-ethylhexyl acrylate
  11.0 g of styrene

Example 6

The procedure of Example 1 is repeated except that, in feedstream 1, 112.5 g of the butyl acrylate are replaced by 112.5 g of 2-ethylhexyl acrylate.

Example 7

The procedure of Example 1 is repeated with the following feedstreams:
Feedstream 1:
  167 g of water
  25.7 g of a 35% strength aqueous solution of the sodium salt of the sulfuric monoester of nonylphenol ethoxylated with 25 ethylene oxide units
  7.5 g of a 25% strength aqueous solution of sodium hydroxide
  0.53 g of tert-dodecyl mercaptan 15.0 g of acrylic acid
112.5 g of methyl acrylate
622.5 g of butyl acrylate Feedstream 2:

167 g of water
25.7 g of a 35% strength aqueous solution of the sodium salt of the sulfuric monoester of nonylphenol ethoxylated with 25 ethylene oxide units
7.5 g of a 25% strength aqueous solution of sodium hydroxide
0.53 g of tert-dodecyl mercaptan
7.5 g of acrylic acid
90.0 g of methyl acrylate
510.0 g of butyl acrylate
112.5 g of 2-ethylhexyl acrylate
30.0 g of styrene

TABLE 1

Composition of the copolymers

|  | AA | MA | BA | EHA | S |
|---|---|---|---|---|---|
| Comparison Example 1 | | | | | |
| 1st stage | 0.5 | 16.5 | 58 | 25 | — |
| 2nd stage | — | — | — | — | — |
| Comparison Example 2 | | | | | |
| 1st stage | 0.5 | 14.5 | 58 | 25 | 2 |
| 2nd stage | — | — | — | — | — |
| Comparison Example 3 | | | | | |
| 1st stage | 0.25 | 8.25 | 41.5 | — | — |
| 2nd stage | 0.25 | 8.25 | 34 | 7.5 | — |
| Example 1 | | | | | |
| 1st stage | 0.25 | 8.25 | 41.5 | — | — |
| 2nd stage | 0.25 | 7.75 | 34 | 7.5 | 0.5 |
| Example 2 | | | | | |
| 1st stage | 0.5 | 8.0 | 41.5 | — | — |
| 2nd stage | 0.25 | 7.75 | 34 | 7.5 | 0.5 |
| Example 3 | | | | | |
| 1st stage | 0.25 | 7.75 | 34 | 7.5 | 0.5 |
| 2nd stage | 0.25 | 8.25 | 41.5 | — | — |
| Example 4 | | | | | |
| 1st stage | 0.25 | 8.25 | 41.5 | — | — |
| 2nd stage | 0.25 | 7.25 | 34 | 7.5 | 1 |
| Example 5 | | | | | |
| 1st stage | 0.25 | 8.25 | 41.5 | — | — |
| 2nd stage | 0.25 | 7.25 | 34 | 7.5 | 1 |
| Example 6 | | | | | |
| 1st stage | 0.25 | 8.25 | 34 | 7.5 | — |
| 2nd stage | 0.25 | 7.75 | 34 | 7.5 | 0.5 |

TABLE 1-continued

Composition of the copolymers

|  | AA | MA | BA | EHA | S |
|---|---|---|---|---|---|
| Example 7 | | | | | |
| 1st stage | 1 | 7.5 | 41.5 | — | — |
| 2nd stage | 0.5 | 6 | 34 | 7.5 | 2 |

TABLE 2

Adhesive values

|  | Solids content (%) | Peel strength (N/2 cm) | AB* | Cohesion (min) |
|---|---|---|---|---|
| Comparison Example 1 | 65.3 | 6.8 | F | 42 |
| Comparison Example 2 | 65.2 | 7.3 | F | 48 |
| Comparison Example 3 | 64.2 | 10.2 | K/PR | 44 |
| Example 1 | 65.5 | 19.1 | K/PR | 49 |
| Example 2 | 65.3 | 17.2 | K/PR | 69 |
| Example 3 | 65.2 | 17.8 | K/PR | 56 |
| Example 4 | 65.4 | 21.2 | K/PR | 38 |
| Example 5 | 49.8 | 22.1 | K/PR | 35 |
| Example 6 | 65.5 | 18.6 | F/K | 55 |
| Example 7 | 64.5 | 19.3 | F | 33 |

*AB: Aspect at break

We claim:

1. A polymer, comprising polymerized units of:

a) from 50–99.98% by weight of a $C_1$–$C_{12}$ alkyl (meth)acrylate;

b) from 0.02 to 5% by weight of a vinyl aromatic compound;

c) from 0–10% by weight of an ethylenically unsaturated acid or of an ethylenically unsaturated acid anhydride; and d) from 0–40% by weight of further monomers;

wherein the polymer has a peel strength of at least 17.2 N/2 cm.

2. The polymer of claim 1, having a peel strength of at least 19.1 N/2 cm.

3. The polymer of claim 2, having a peel strength of at least 21.2 N/2 cm.

4. A substrate coated with pressure sensitive adhesive comprising polymer of claim 1.

5. A label coated with pressure sensitive adhesive comprising polymer of claim 1.

* * * * *